G. R. HILL, Jr.
DETACHABLE HANDLE FOR SAUCEPANS AND OTHER COOKING UTENSILS.
APPLICATION FILED FEB. 26, 1920.
1,364,552.
Patented Jan. 4, 1921.
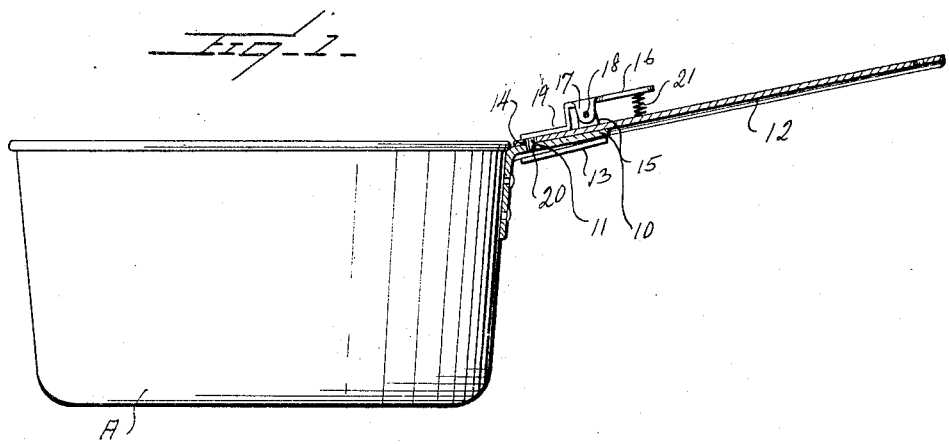
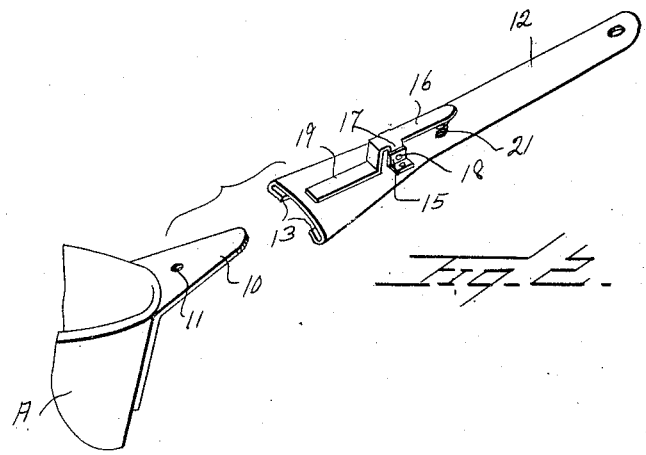
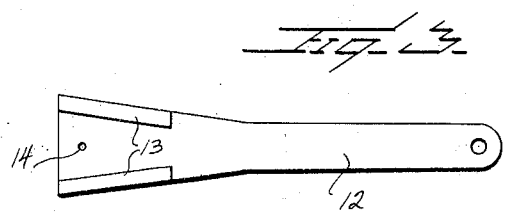
Inventor
G. R. Hill, Jr.
By Watson E. Coleman
Attorney

UNITED STATES PATENT OFFICE.

GEORGE R. HILL, JR., OF PHILADELPHIA, PENNSYLVANIA.

DETACHABLE HANDLE FOR SAUCEPANS AND OTHER COOKING UTENSILS.

1,364,552. Specification of Letters Patent. Patented Jan. 4, 1921.

Application filed February 26, 1920. Serial No. 361,387.

*To all whom it may concern:*

Be it known that I, GEORGE R. HILL, Jr., a citizen of the United States, residing at Philadelphia, in the county of Philadelphia and State of Pennsylvania, have invented certain new and useful Improvements in Detachable Handles for Saucepans and other Cooking Utensils, of which the following is a specification, reference being had to the accompanying drawings.

This invention relates to handles, and particularly to a handle designed for use with cooking utensils, such as saucepans and the like, and the general object of the invention is to provide a very simple device of this character embodying a handle adapted to fit upon the stub or handle of a saucepan in the form of an extension thereof, and having means whereby it may be detachably engaged with the stub or handle of the saucepan.

A further object is to do away with the necessity of using handles on saucepans and other culinary utensils, but provide utensils with stubs extending out therefrom where the handles would ordinarily go, and provide a detachable handle which may be used with any utensil and engaged with the stub thereof, said handle being so formed as to be rigidly engaged with the stub of the saucepan or other article and permit the certain and ready manipulation of the utensil, and which will be cool so as to permit the utensil to be readily handled.

Other objects will appear in the course of the following description.

My invention is illustrated in the accompanying drawings, wherein:—

Figure 1 is a side elevation of a saucepan, the handle thereof being in section;

Fig. 2 is a fragmentary perspective view of a portion of the saucepan, the stub and the handle;

Fig. 3 is an under side plan view of the handle.

In these drawings I have illustrated my handle as applied to a saucepan A. The use of a saucepan is purely illustrative, as any other cooking utensil might be illustrated as well. This utensil A is provided with an outwardly projecting stub 10 at a point where the handle would ordinarily project, this stub being relatively short and being preferably somewhat tapering outwardly and formed with a perforation 11.

The handle 12 is made of sheet metal or like material, transversely curved to give a proper form to the handle, and at one end is flared outwardly so as to fit over the tapering stub 10. This flared end of the handle has inwardly extending lugs or flanges 13 adapted to embrace the side edges of the stub 10 and fit beneath the stub. This handle is perforated, as at 14. Extending upward from the upper end of the handle are the ears 15 which are perforated, and disposed between these ears is a latch 16 having ears 17 through which a pintle 18 passes, this pintle pivotally connecting the latch to the ears 15. The forward end of the latch is angularly bent toward the handle and then longitudinally extended, as at 19, and provided with a stud 20 adapted to pass through the perforations 14 and 11. A spring 21 urges the rear end of the latch outward and the stud 20 into engagement with the perforations.

In applying this device to a saucepan, the rear end of the latch is depressed by the thumb, the handle inserted upon the stub, and then the latch is released, whereupon the pin will enter the perforations 14 and 11 and lock the handle to the saucepan. A depression of the rear end of the latch and an outward pull on the handle will, of course, release it from the saucepan.

It will be seen that my device is very simple, that it is relatively cheap, and that by its use culinary utensils may be made without the relatively expensive handles now attached to them, but instead be made with relatively short stubs 10, and that one handle may thus do for a variety of cooking utensils. This will reduce the cost of making the saucepan or other article, and also reduce the space taken up by these utensils in a shop and in the kitchen. Further than this, the handle, when applied to a saucepan on a stove, will be relatively cool so that there need be no danger of burning the hands, and the utensil may be more readily handled as a consequence. Of course, if the utensil is of enameled ware, the handle will likewise be enameled, and obviously the handle will be made of various sizes to suit various sizes of utensils and various strengths, depending upon the utensil with which it is intended to be used.

I claim:—

The combination with a utensil having a tapered stub projecting from its rim and having an opening, of a handle having one end portion tapered inwardly and provided with an opening, the marginal edges of the sides of said tapered portion being extended back upon said portion toward each other to provide guides and adapted to receive the stub, the tapered portion of the handle and the stub causing registration of the openings therein, a pair of ears carried by said handles remote from said guides, and a latch member having its intermediate portion disposed in right angular relation to its end portion and having one end portion offset with respect to the other end portion, the extremity of one end portion of said latch being extended in right angular relation to said end and adapted to be disposed in said registering openings, said last mentioned end portion limiting the insertion of said extremity, and means disposed between the handle and the other end portion for yieldably urging said end portion into engagement with the handle.

In testimony whereof I hereunto affix my signature.

GEORGE R. HILL, Jr.